United States Patent
Logemann

[11] 3,867,442
[45] Feb. 18, 1975

[54] PROCESS FOR PREPARING UREA

[75] Inventor: Johan D. Logemann, Geleen, Netherlands

[73] Assignee: Stamicarbon N.V., Heerlen, Netherlands

[22] Filed: Dec. 28, 1971

[21] Appl. No.: 213,115

[30] Foreign Application Priority Data
Dec. 31, 1970 Netherlands .................. 7019056

[52] U.S. Cl. .................................. 260/555 A
[51] Int. Cl. ............................... C07c 127/00
[58] Field of Search ...................... 260/555 A

[56] References Cited
UNITED STATES PATENTS

| | | | |
|---|---|---|---|
| 3,310,376 | 3/1967 | Cook et al. | 260/555 |
| 3,406,201 | 10/1968 | Baumann et al. | 260/555 |
| 3,503,970 | 3/1970 | Kanni et al. | 260/555 |

Primary Examiner—Leon Zitver
Assistant Examiner—A. Siegel
Attorney, Agent, or Firm—Cushman, Darby & Cushman

[57] ABSTRACT

A process for manufacturing urea by reacting ammonia and carbon dioxyde is described wherein the ammonium carbamate present in the synthesis effluent is decomposed under high pressure, the gas mixture resulting therefrom is at least partially condensed under a high pressure and the gas-liquid mixture produced in the condensation zone is introduced into the synthesis zone. The ammonia and carbon dioxide still present in the synthesis solution after the high pressure decomposing of the ammonium carbamate are removed under a low pressure whereby an ammonium carbamate solution is produced, which is used as a washing agent for recovering ammonia and carbon dioxide from an inerts containing gas mixture discharged from the synthesis zone. The wash solution thus obtained is introduced into the condensation zone, together with a quantity of urea containing solution from the synthesis zone, by means of a jet pump driven by fresh ammonia.

3 Claims, 1 Drawing Figure

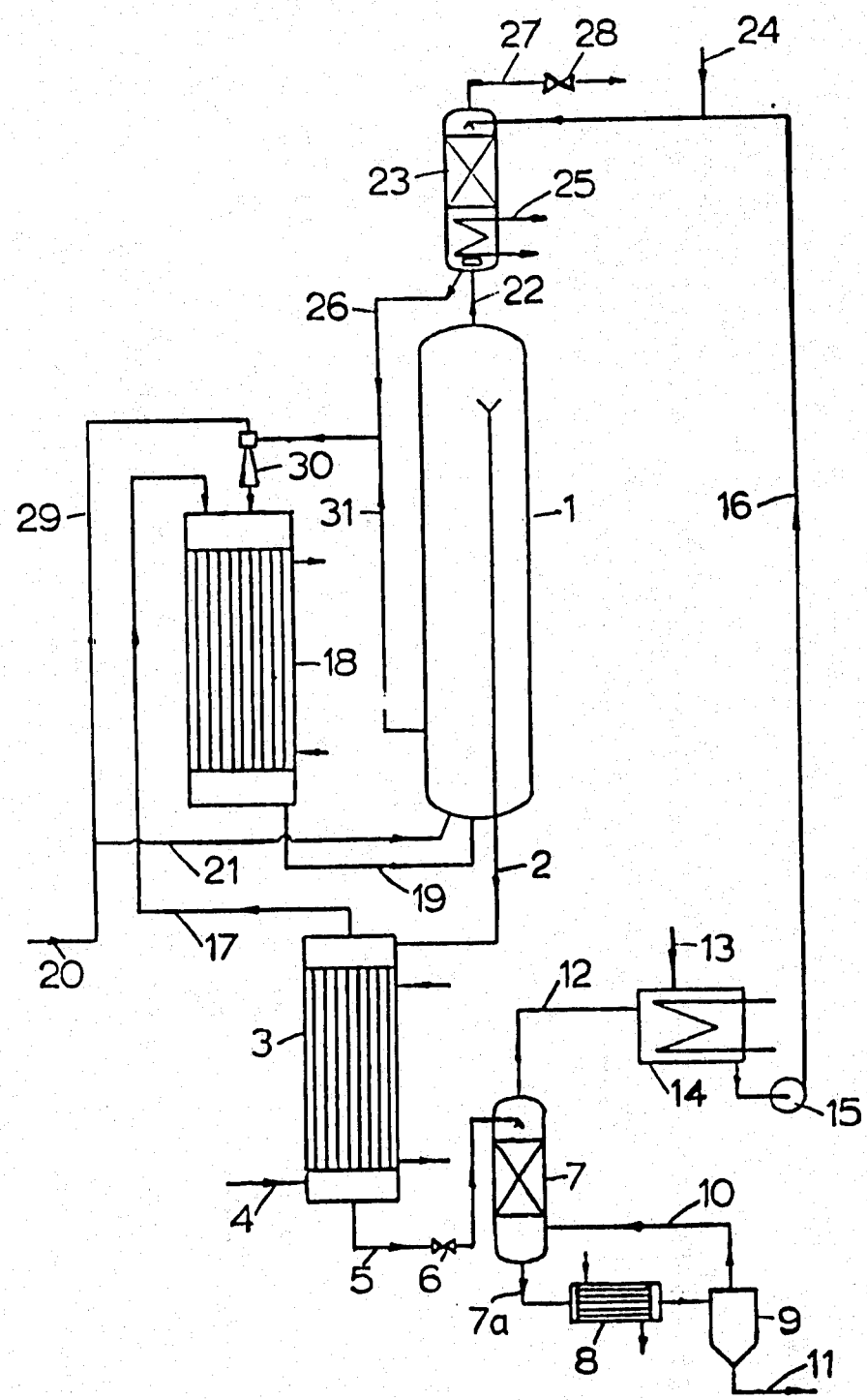

PROCESS FOR PREPARING UREA

The invention relates to a process for preparing urea from ammonia and carbon dioxide.

BACKGROUND OF THE INVENTION

As is well known, if at a suitable pressure (125–350 atm) and at a suitable temperature (170–250 C), ammonia and carbon dioxide are led into a synthesis zone, ammonium carbamate is first formed, and then partly subsequently converted to urea. The degree to which the latter conversion reaction progresses depends, amongst other factors, on the amount of excess ammonia employed. As reaction product, a solution is obtained which mainly consists of urea, water, ammonium carbamate and unbound ammonia. The ammonium carbamate and the ammonia should be removed from the solution and are either processed into by-products or recycled to the synthesis zone.

To this end, according to a known process, the synthesis product solution is heated, under high pressure, and simultaneously contacted with gaseous carbon dioxide. In this, so-called, stripping treatment the bulk of the ammonium carbamate is caused to decompose, and the liberated ammonia and carbon dioxide together with the free excess ammonia already present, and the equilibrium quantity of water vapor, are expelled from the solution.

Part of the gas mixture so obtained is then condensed under a high pressure in a condensation zone. Then, after expansion, further ammonia and carbon dioxide are separated off from the stripped synthesis solution and subsequently converted, by condensation in an aqueous liquid, to an ammonium carbamate solution, which solution is returned to the high-pressure stage of the process.

In the condensation of the gas mixture expelled as a result of the stripping treatment, ammonia and carbon dioxide are also converted to ammonium carbamate, a substantial amount of condensation heat thus being liberated, since the formation of ammonium carbamate is strongly exothermic. This liberated heat can be used for the production of steam or for heating process liquids.

The ammonium carbamate solution originating in the low-pressure stage is invariably returned to the synthesis zone via the condensation zone, since the ammonium carbamate formed in the condensation zone will dissolve in this solution. By this technique the equilibrium temperature is increased and the heat of condensation thus becomes available at a higher, and more valuable temperature level, whilst, at the same time, the risk of solid ammonium carbamate crystallizing out of the solution and, hence, of clogging the apparatus is also avoided. The condensation zone is also supplied, again for the purpose of increasing the equilibrium temperature, with part of the fresh ammonia required in the process.

As a rule, however, condensation of the gas mixture is not completely effected in the condensation zone. A gas-liquid mixture is passed from the condensation zone to the synthesis zone, which mixture still contains such quantities of free ammonia and carbon dioxide so that by its subsequent condensation to ammonium carbamate a sufficient quantity of heat becomes available to completely cover the heat demands of the endothermic conversion of the ammonium carbamate to urea.

When employing the process described above, the synthesis zone contains, in addition to the liquid phase, a gas phase consisting of relatively large quantities of ammonia, carbon dioxide and, further, a quantity of inert constituents which were either present, in part, in the reaction components as contaminations, or, which may also have been introduced into the system as air, particularly if the process is carried out in e.g., stainless steel equipment kept in the passive condition by means of oxygen. This gas mixture is discharged from the synthesis zone, whereupon in a separation zone the ammonia and carbon dioxide carried along therewith are recovered, the inert waste gas being vented.

It is well known that solutions containing ammonium carbamate are very highly corrosive and erosive. For this reason, in processes such as the one described above, the displacement of the various solutions is usually effected by natural circulation means, brought about by arranging the stripping zone below the level of the respective synthesis and the condensation zones. In this arrangement, pumps which otherwise would have to operate under extreme conditions, and which would then be a source of many failures, are rendered superfluous. Also, the liquid or dissolved ammonium carbamate formed in the separation zone for the inert gases is also recirculated by means of gravity, notably to the initial part of the synthesis zone. For this purpose the separation zone is located at a higher level than the synthesis zone.

In practice, the ammonia and the carbon dioxide are separated from the inert gas by washing, since removal of the same by cooling involves the risk that the lines and various equipment will become clogged by deposition of solid ammonium carbamate. Water is used as wash liquid. It would be disadvantageous here to use as the wash liquid the ammonium carbamate solution recycled from the low-pressure stage, as is done according to other urea stripping process techniques, because such a solution would, in the instant case, have to be introduced into the synthesis zone without having passed through the condensation zone. This condition would result in a lower, undesirable, equilibrium temperature. The reason for this is that the pressure in the condensation zone is so high that, in order to obtain a sufficient static pressure for displacement of the liquid, it would be necessary for the device containing the washing zone to be arranged at a substantial distance above the synthesis zone. Seeing that the synthesis zone or reactor itself already extends to a considerable height, the foregoing arrangement is subject to several practical disadvantages including, for instance, problems on the assembly of the apparatus.

However, the use of water as the wash liquid involves its own drawback in that an additional quantity of water is introduced into the high-pressure stage of the process, which water, ultimately, enters the synthesis zone, where its presence has an adverse effect on the equilibrium conversion of ammonium carbamate to urea.

DESCRIPTION OF THE INVENTION

The present invention provides a process technique by which the various above-mentioned disadvantages of the prior art processes are not only avoided, but also some special advantages are achieved.

Specifically, the present invention relates to a process for preparing urea from ammonia and carbon dioxide, at a suitable pressure and temperature, in which the ammonium carbamate contained in the resulting synthesis solution is made to decompose under a high pressure, and the ammonia and carbon dioxide components then present in the mixture are thereafter expelled. Subsequently, these gases, together with the water vapor carried along therewith, are at least in part condensed under a high pressure, in a condensation zone, with a supply of ammonia. The gas-liquid mixture so obtained is then led into a synthesis zone, whilst further ammonia and carbon dioxide are removed, at a lower pressure, from the remainder of the synthesis solution, and are themselves processed into an aqueous ammonium carbamate solution, which solution is recirculated.

Further, a gas mixture is also discharged from the synthesis zone, which mixture contains the inert constituents, introduced into the process as described above, and the ammonia and carbon dioxide present in the gas mixture are removed therefrom in a washing zone, whereupon the resulting solution is also recirculated.

According to this invention, the gas mixture discharged from the synthesis zone, and containing the inert constituents, is washed with the aid of ammonium carbamate solution originating in the low-pressure stage. The solution which is obtained from this washing step is then introduced into the condensation zone, together with a quantity of urea-containing solution from the synthesis zone, by means of a liquid-jet pump, which pump is driven by the ammonia which has to be supplied to the condensation zone.

The process according to the invention has several advantages: no extra water is introduced into the high-pressure stage since the gas mixture containing the inert gas is washed with the aid of a solution which in any event must be treated in the high pressure stage. The absorption and condensation heat liberated during the washing step can now be used to heat this solution to the equilibrium temperature which is desired in the condensation zone. As a result of this, an appreciably larger part of the heat liberated in the condensation zone will be available for the production of steam, or for the heating of process steams, while, only a small part of the heat liberated in the washing zone need be discharged by means of cooling water.

Since the jet pump must be so dimensioned that a sufficient delivery head is available even during periods of time when the plant is operating substantially below its design production capacity, when under its maximum load the delivery head will be larger than required for displacement of the ammonium carbamate solution from the washing zone to the condensation zone, in part resulting from the higher efficiency of the jet pump under these conditions. By utilizing this additional delivery head, according to the invention, for aspirating a portion of the urea-containing solution from the synthesis zone, this urea-containing solution is thus led into the condensation zone. Since ammonium carbamate also dissolves in urea, this again results in the equilibrium temperature being increased, so that the heat of condensation can again be utilized at a higher temperature level, as a result of which smaller heat-transfer surfaces are sufficient for production of a given amount of steam.

If the process according to the invention is utilized in a system wherein an ammonium carbamate solution from a melamine plant is also processed in the high-pressure section of the urea synthesis, this solution, can also be supplied, in whole or in part, to the washing zone as absorption agent.

DESCRIPTION OF THE ILLUSTRATED EMBODIMENT OF THE INVENTION

This invention will now be illustrated on the basis of the attached FIGURE in which one embodiment thereof is schematically shown.

In the synthesis reactor, 1, a synthesis solution is formed which contains ammonium carbamate and unbound ammonia, in addition to urea and water. Via overflow line 2 the solution is led into a stripping column, 3, to which heat is supplied indirectly, for instance by means of steam. In column 3, the synthesis solution is contacted and stripped with carbon dioxide gas delivered by line 4. This stripping treatment causes a very large part of the ammonium carbamate present to decompose into ammonia and carbon dioxide, both the liberated and dissolved gases being expelled from the solution. The stripped product solution leaves the stripping column through line 5, expands through reducing valve 6, and is then introduced into rectifying column 7, wherein the gas mixture liberated during the expansion is separated off. The bottom-product of the rectifying column is heated in heat exchanger 8, to dissociate the remaining ammonium carbamate still present therein. The additional ammonia and carbon dioxide gases thus liberated are then separated off in separator 9, together with the quantity of water vapor which is in equilibrium therewith under the prevailing conditions.

Via line 10 this last-mentioned gas mixture is led into the bottom section of rectifying column 7. The gas mixture ascending through this column is cooled by the descending expanded stripped synthesis solution, so that a considerable part of the water vapor content of the gas phase is condensed, and is removed from the column with the solution phase. The product urea solution discharged from the separator 9 is passed on via line 11 to the subsequent processing section, for instance to an evaporation or to a crystallization section.

The gas mixture discharged from the top part of rectifying column 7, and consisting of ammonia, carbon dioxide and water vapor is then led via line 12, possibly together with some aqueous process liquid delivered by line 13, into condenser 14, wherein a dilute ammonium carbamate solution is formed. This dilute solution is then transported to the high-pressure section of the installation by pump 15 through line 16.

A gas mixture consisting of ammonia, carbon dioxide and water vapor is removed from the top part of stripping column 3, via line 17, and is at least partly condensed in condenser 18, the resulting mixture of an aqueous ammonium carbamate solution and unbound gaseous ammonia and carbon dioxide flowing into the bottom section of synthesis reactor 1 via line 19. The requisite supply of fresh ammonia to the reactor is delivered to the reactor through lines 20 and 21. In the reactor, the formation of ammonium carbamate is completed, and the bulk of the ammonium carbamate is also converted into urea, and the water thus formed (1 mol of water for every mol of urea).

The inert, gaseous constituents, which are supplied to the process principally as components of the fresh reaction feeds, collect in the top part of reactor 1, as do considerable quantities of gaseous ammonia and carbon dioxide. In order for these latter valuable constituents to be recovered therefrom, this overhead gas mixture is passed through line 22 into washing column 23 which is in turn irrigated with the dilute ammonium carbamate solution supplied from the low-pressure system via line 16, and, optionally, also with the ammonium carbamate solution supplied from a melamine preparation plant, e.g. via line 24. Practically all the ammonia and carbon dioxide content of the inert gas mixture is dissolved and condensed in this wash liquid. Part of the absorption, and the condensation heat thus made available is removed by a coolant fluid, flowing through cooling coil 25, in sufficient amount so that the ammonium carbamate solution to be sent to condenser 18 via line 26 is brought to approximately the desired condensation temperature. The remaining inert gas mixture, which is not condensed, is discharged via line 27 and expansion valve 28.

However, the difference in height between the liquid level in the bottom part of the washing column, 23, and the inlet aperture in condenser 18 does not provide sufficient hydrostatic pressure to cause the ammonium carbamate solution to flow down adequately from the washing column to the condenser. On the other hand, it is desirable for the molar ratio between the ammonia and the carbon dioxide quantities in the condenser to be kept at a certain value, at a given pressure, in order to reach an optimum equilibrium temperature. To this end, part of the ammonia necessary for the urea synthesis is sent to the condenser 18 through line 29.

According to this invention, the energy present in the liquid ammonia thus delivered through line 29 is now utilized, by means of jet pump 30, to make up for the deficiency in the pressure head between column 23 and condenser 18, and also to aspirate, a small quantity of the liquid mixture present in the reactor, via line 31. The beneficial effect of this technique on the performance of the condenser depends, however, on the degree of urea conversion which has been reached in the reactor solution at the point where it is withdrawn from reactor 1 and aspirated through line 31.

If line 31 is connected to the bottom part of the synthesis reactor the urea and water proportions therein will be low and consequently the condensation temperature will be only slightly raised.

If, on the other hand, the solution is aspirated out of the top of the reactor, the condensation temperature will then be substantially increased indeed, because the higher proportions of urea and water provide a larger amount of dissolving agent for the ammonium carbamate, and the thus-liberated heat can then be discharged via a smaller heat-exchanging surface. However, because the entire quantity of urea in the solution so removed from the reactor is again returned to the bottom part of the reactor via line 19, along with the ammonium carbamate-containing gas-liquid mixture formed in the condenser 18, a back-mixing effect will then be brought about. This effect will appreciably reduce the conversion of the ammonium carbamate to urea in reactor 1. For these reasons it is desirable that the reactor solution be aspirated at an appropriate intermediate level in the reactor.

To illustrate the effect of this technique of the invention, an example is given below relating to a urea plant having a production capacity of 1,000 tons a day. In the high-pressure part of this plant the pressure amounts to 140 atm.

From the synthesis reactor, 1, a gas flow is discharged, via line 22, consisting of 3620 kg/h of $CO_2$, 4630 kg/h of $NH_3$, 264 kg/h of water vapor and 1180 kg/h of non-condensable gases. The gaseous $NH_3$, $CO_2$ and $H_2O$ are completely condensed in washing column 23.

In the prior art process described in the introduction of this specification, 2200 kg per hour of water had to be introduced in order to achieve this condensation. The discharge of the washing column was then sent to the lower part of the synthesis reactor.

During the absorption and condensation in the washing column 2,900,000 kcal/h were liberated, a small part of which viz 220,000 kcal/h, was consumed to heat the washing water from 70° to 170°C, whilst the remaining 2,680,000 kcal/h had to be discharged by means of cooling water.

Of the last-mentioned quantity of heat only a small part can be utilized, because of the low temperature level thereof, approximately 100°C.

In this old process, the dilute ammonium carbamate solution supplied from the low-pressure stage was led direct to condenser 18. Upon delivery, this solution, which consists of 4700 kg/h of $NH_3$, 5780 kg/h of $CO_2$ and 4400 kg/h of $H_2O$, had a temperature of 80°C and had to be heated in the condenser to the condensation temperature which was about 170°C. For this purpose, 1,380,000 kcal/h of the liberated heat of condensation was utilized.

When applying the technique according to the present invention, this low pressure ammonium carbamate solution is instead used as the wash liquid in the washing column, rather than water. Now, in this case, the solution in the washing column takes up the 1,380,000 kcal/h which are necessary to increase its temperature to about 170°C. In this case the quantity of heat which must be discharged from the washing column by means of cooling water amounts to only 1,520,000 kcal/h.

For a urea plant in which the process of the invention can be realised and which, again, has a production capacity of 1000 tons a day, a material balance also containing the pressures and temperatures of the various process streams is given in the accompanying table. The amounts stated are in kilograms per hour.

The ammonium carbamate solution discharged from the washing column 23, amounting in total to 23,394 kg/h, is then introduced into condenser 18 with the aid of the liquid-jet pump, 30, which pump 30 is in turn driven by a quantity of 11,600 kg/h of liquid ammonia, and which pump at the same time aspirates about 20,000 kg/h of solution from the synthesis reactor 1, via line 31 and transports this solution to the condenser 18.

Since the ammonium carbamate solution from the washing column has already been raised to a temperature of 170°C, it need no longer be heated in the condenser as was the case previously. In the condenser, therefore, an additional quantity of 1,380,000 kcal/h becomes available as heat which may be utilized in the plant facility.

This last-mentioned quantity of heat may, for instance, be used to produce an additional amount of 2700 kg/h at 3 to 4 ats g. of low-pressure steam, amounting to 65 kg per ton of urea.

Table

|   | 2 | 4 | 5 | 7a | 10 | 11 | 12 | 13 | 16 |
|---|---|---|---|----|----|----|----|----|-----|
| $NH_3$ | 40700 | — | 4700 | 2600 | 1840 | 760 | 3940 | 760 | 4700 |
| $CO_2$ | 24000 | 30600 | 5780 | 1070 | 1830 | 140 | 5620 | 160 | 5780 |
| Urea | 41700 | — | 41700 | 41700 | — | 41700 | — | 2480 | — |
| $H_2O$ | 19600 | — | 16900 | 18080 | 3080 | 15000 | 1920 | — | 4400 |
| Inerts | — | 1180 | — | — | — | — | — | — | 140 |
| P (ats g) | 140 | 140 | 140/3.5 | 3.5 | 3.5 | 3.5 | 3.5 | — | 80 |
| t (°C) | 183 | — | 160 | 111 | 135 | 135 | 108 | — | 80 |

|   | 22 | 27 | 26 | 31 | 20 | 29 | 17 | 19 | 21 |
|---|----|----|----|----|----|----|----|----|-----|
| $NH_3$ | 4630 | — | 9330 | 7680 | 23600 | 11600 | 36000 | 64610 | 12000 |
| $CO_2$ | 3620 | — | 9400 | 7080 | — | — | 48820 | 65300 | — |
| Urea | — | — | — | 2980 | — | — | — | 2980 | — |
| $H_2O$ | 264 | — | 4664 | 2260 | — | — | 2700 | 9624 | — |
| Inerts | 1180 | 1180 | — | — | — | — | 1180 | 1180 | — |
| P (ats g) | 140 | 140 | 140 | 140 | 200 | 200 | 140 | 140 | 140 |
| t (°C) | 183 | — | 170 | — | — | — | 180 | 173 | — |

Further, the difference in temperature between the ammonium carbamate side and the steam side of the condenser tubes is now 3°C greater, which is equal to 15% of the original difference in temperature of 20°. Therefore, in the process according to this invention, for the discharge of the same quantity of heat, a heat-transfer surface of only 85% of that previously required is now sufficient.

Furthermore, no extra water is introduced into the bottom part of the synthesis reactor as a result of operation of the washing column 23. As a result, the conversion of ammonium carbamate to urea is increased by about 2 to 3%. Because of this increased conversion, there is less ammonium carbamate in the synthesis solution, and consequently the decomposition load on stripper 3 is reduced, and less gas needs to be expelled. This condition results, in turn, in a saving in the requirement of high-pressure steam (20 ats g) of about 75 kg per ton of urea.

Summarizing the above, it can be said that using the technique according to the invention provides the following advantages in a urea plant having a capacity of 1,000 tons a day when operated according to this novel stripping and recovery process:

a. an additional production of about 65 kg of low-pressure steam per ton of urea;
b. a reduction in the requirement of high-pressure steam of about 75 kg per ton of urea; and
c. a reduction of the heat-transfer surface in the high-pressure condenser of about 15%.

What is claimed is:

1. In processes for the synthesis of urea by reacting ammonia and carbon dioxide in a synthesis zone, at elevated temperature and pressure and wherein the ammonium carbamate, contained in the effluent synthesis solution which is withdrawn from said synthesis zone, is decomposed at high pressure and the ammonia and carbon dioxide content of said solution is thereafter expelled therefrom firstly in a high pressure zone to generate a high pressure ammonia-carbon dioxide-water vapor mixture and secondly in a low pressure zone to generate a low pressure ammonia-carbon dioxide-water vapor mixture, fresh carbon dioxide is supplied to said high pressure zone and an aqueous urea solution substantially free of ammonium carbamate is discharged from said low pressure zone, and wherein said high pressure mixture, together with fresh ammonia feed, is condensed in a high pressure condensation zone and then recirculated to said synthesis zone, and said low pressure mixture is processed into a low pressure ammonium carbamate solution for recirculation, and an inert-containing overhead gas mixture is also discharged from said synthesis zone and processed through a washing zone for recovery of ammonia and carbon dioxide components therefrom into a high pressure ammonium carbamate solution, for recirculation, the improvement consisting essentially in:

a. compressing and delivering said low pressure ammonium carbamate solution to said washing zone for effecting said recovery of ammonia and carbon dioxide components from said overhead gas and to generate a wash solution;
b. withdrawing a quantity of urea-containing solution from said synthesis zone; and
c. utilizing a jet pump, driven by said fresh ammonia feed, to deliver said wash solution and said urea-containing solution to said high pressure condensation zone, whereby, introduction of additional water in said washing zone is substantially avoided and the heat required to raise the wash solution to the temperature of the said high pressure condensation zone is obtained in said washing zone and thereby excess heat utilizable at a higher temperature is available from said high pressure condensation zone.

2. The process of claim 1 wherein said urea-containing solution is withdrawn from a point intermediate the bottom level and about the mid level of said synthesis zone.

3. The process of claim 1 wherein an ammonium carbamate solution recirculated from a melamine preparation plant, is also introduced into said washing zone as washing liquid.

* * * * *